(12) United States Patent
Arakaki et al.

(10) Patent No.: US 11,163,105 B1
(45) Date of Patent: Nov. 2, 2021

(54) SYSTEM FOR OPTICAL SENSING

(71) Applicant: Palo Alto Research Center Incorporated, Palo Alto, CA (US)

(72) Inventors: Kyle Arakaki, Mountain View, CA (US); Peter Kiesel, Palo Alto, CA (US); Ajay Raghavan, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 17/135,356

(22) Filed: Dec. 28, 2020

(51) Int. Cl.
| | | |
|---|---|---|
| *G02B 6/34* | (2006.01) | |
| *F21V 8/00* | (2006.01) | |
| *G02B 6/02* | (2006.01) | |
| *G02B 6/12* | (2006.01) | |

(52) U.S. Cl.
CPC ........ *G02B 6/0073* (2013.01); *G02B 6/02076* (2013.01); *G02B 2006/12088* (2013.01); *G02B 2006/12123* (2013.01); *G02B 2006/12138* (2013.01)

(58) Field of Classification Search
CPC .............. G02B 6/0073; G02B 6/02076; G02B 2006/12138; G02B 2006/12088; G02B 2006/12123

See application file for complete search history.

(56) References Cited

U.S. PATENT DOCUMENTS

| | | | | |
|---|---|---|---|---|
| 5,699,468 | A | * 12/1997 | Farries | G02B 6/022 385/140 |
| 6,072,567 | A | * 6/2000 | Sapack | G01V 1/52 356/32 |
| 6,317,538 | B1 | * 11/2001 | Shigehara | G02B 6/0208 385/24 |
| 6,317,539 | B1 | * 11/2001 | Loh | G02B 6/2932 385/123 |
| 6,398,778 | B1 | * 6/2002 | Gu | G02B 6/0008 356/72 |
| 9,677,916 | B2 | 6/2017 | Hegyi et al. | |
| 2004/0037342 | A1 | * 2/2004 | Blauvelt | H01S 5/14 372/97 |
| 2013/0333476 | A1 | * 12/2013 | Omichi | G01H 9/004 73/655 |
| 2016/0266265 | A1 | * 9/2016 | Kruspe | G01V 1/186 |
| 2017/0202623 | A1 | 7/2017 | Richmond et al. | |

* cited by examiner

*Primary Examiner* — Ellen E Kim
(74) *Attorney, Agent, or Firm* — Mueting Raasch Group

(57) ABSTRACT

A sensor system includes an optical fiber. A set of wavelength shift sensors are inscribed on the optical fiber. The set includes at least one first wavelength shift sensor configured to reflect a first wavelength band of input light as a first optical output signal. The first wavelength shift sensor has a first value of an optical characteristic that modifies intensity of the first optical output signal. At least one second wavelength shift sensor is configured to reflect a second wavelength band of input light as a second optical output signal. The second wavelength shift sensor has a second value of the optical characteristic that modifies intensity of the second optical output signal, wherein the second value is different from the first value.

20 Claims, 10 Drawing Sheets

SYSTEM FOR OPTICAL SENSING

BACKGROUND

Broadband light is used as the input light in many optical sensing applications. In a wavelength multiplexed sensing system, broadband light can be used to as input light to many fiber optic sensors disposed along a single optical fiber. For example, a number of fiber Bragg grating (FBG) sensors may be disposed at different locations of an optical fiber, each FBG sensor reflecting a different wavelength band. Each FBG sensor reflects a different spectral portion of the broadband input light as output light from the sensor. The output light of each of the multiple FBG sensors can be spectrally resolved allowing acquisition of sensing information from each sensor. This technique is often referred to as wavelength multiplexed optical sensing.

SUMMARY

Embodiments described herein involve a sensor system comprising: an optical fiber. A set of wavelength shift sensors are inscribed on the optical fiber. The set comprises at least one first wavelength shift sensor configured to reflect a first wavelength band of input light as a first optical output signal. The first wavelength shift sensor has a first value of an optical characteristic that modifies intensity of the first optical output signal. At least one second wavelength shift sensor is configured to reflect a second wavelength band of input light as a second optical output signal. The second wavelength shift sensor has a second value of the optical characteristic that modifies intensity of the second optical output signal, wherein the second value is different from the first value.

Embodiments involve a method of making a sensor system comprising inscribing a set of wavelength shift sensors on an optical fiber. The set comprises at least one first wavelength shift sensor configured to reflect a first wavelength band of input light as a first optical output signal. The first wavelength shift sensor has a first value of an optical characteristic that affects intensity of the first optical output signal. At least one second wavelength shift sensor is configured to reflect a second wavelength band of input light as a second optical output signal. The second wavelength shift sensor has a second value of an optical characteristic that affects intensity of the second optical output signal, wherein the first value is different from the second value.

A method involves generating input light for a sensor system. The sensor system comprises an optical fiber. A set of wavelength shift sensors are inscribed on the optical fiber. The set comprises at least one first wavelength shift sensor having a first value of an optical characteristic. At least one second wavelength shift sensor has a second value of the optical characteristic different from the first value. A first wavelength band of the input light is reflected as a first optical output signal. The first value of the optical characteristic affects an intensity of the first optical output signal. A second wavelength band of the input light is reflected as a second optical output signal. The second value of the optical characteristic affects an intensity of the second optical output signal.

BRIEF DESCRIPTION OF THE DRAWINGS

Throughout the specification reference is made to the appended drawings wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
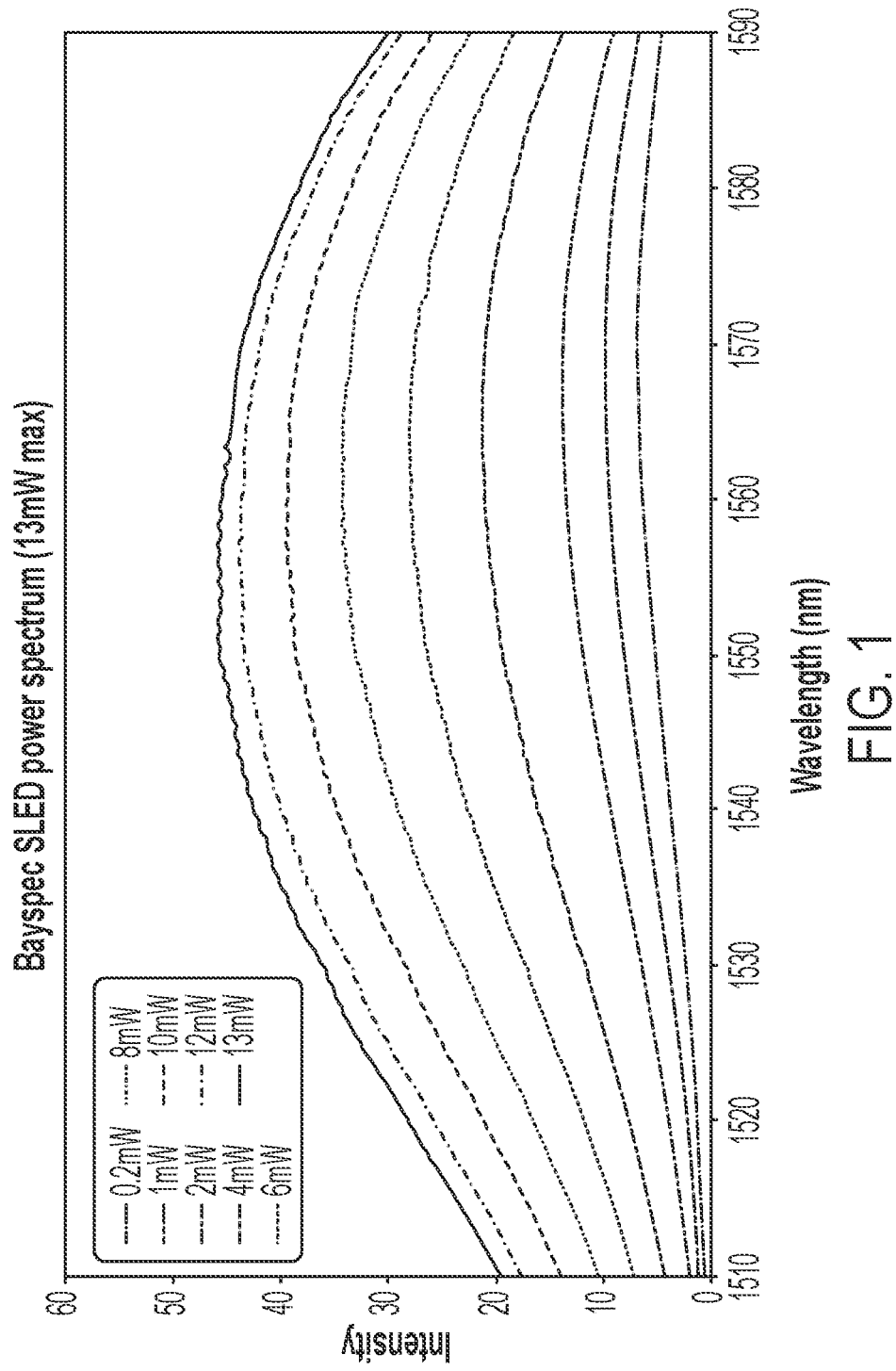
FIG. 1 shows the power output of a broadband light source comprising a superluminescent light emitting diode (SLED)

The power output of broadband light sources is typically non-uniform with respect to wavelength. FIG. 1 shows the output intensity of a broadband light source comprising a superluminescent light emitting diode (SLED). As illustrated by FIG. 1, the intensity of the broadband light source varies with wavelength throughout the spectrum of the light source.

Broadband light sources are useful for wavelength multiplexed optical sensing because they can be used as input light for many FBG sensors disposed on a single optical fiber and reflecting light in many different wavelength bands. When the intensity (or optical power) of the input light is non-uniform with respect to wavelength and the sensors have substantially the same response at their wavelength band, the intensity (or optical power) of the light reflected by the FBG sensors disposed along the optical fiber will also be non-uniform. Referring again to FIG. 1, in an uncompensated sensor array FBG sensors having wavelength bands that correspond to wavelengths near the peak of the intensity vs wavelength curve of the input light will reflect a higher intensity light. Those FBG sensors having wavelength bands corresponding to wavelengths fall near the edges of the intensity v. wavelength curve of the input light will reflect a lower intensity light. Systems acquiring information from the FBG sensors often use a minimum intensity threshold to separate received signals apart from the noise. When the measured signals from all the FBG sensors are significantly greater than the minimum intensity threshold, the noise characteristics of the system are enhanced. Thus, it can be useful to use a compensated FBG sensor array as described herein in which the intensity of the reflected light from the sensors is more uniform. While embodiments described herein use FBG sensors as an example of wavelength shift sensors, it is to be understood that the sensors can include any other type of wavelength shift sensor (e.g., Fabry-Perot sensors).

Figure 2A:
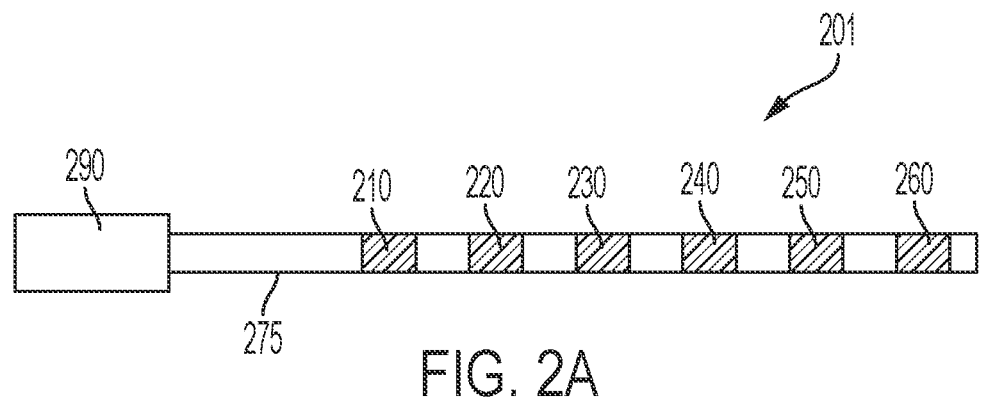
FIG. 2A shows a sensing system comprising an optical fiber and a compensated array of multiple FBG sensors inscribed along optical fiber in accordance with some embodiments.

Some embodiments described herein are directed to systems and methods that compensate for spectral non-uniformities of input light to multiple FBG sensors inscribed along an optical fiber. FIG. 2A shows a sensing system 201 comprising an optical fiber 275 and a compensated sensor array comprising multiple FBG sensors 210-260 inscribed at various locations along optical fiber 275 in accordance with some embodiments. Each FBG sensor 210-260 is configured to receive input light from a light source 290 and to reflect a portion of the input light in a wavelength band of the FBG sensor 210-260.

The compensated sensor array of system 201 includes at least a first FBG sensor 210 having a first value of an optical characteristic. The first FBG sensor 210 is configured to reflect a first wavelength band as a first optical output signal from the first FBG sensor 210. The compensated sensor array of system 201 includes at least a second FBG sensor 220 having a second value of an optical characteristic. The second FBG sensor 220 is configured to reflect a second wavelength band of input light as a second optical output signal from the second FBG sensor 220. The optical characteristic affects the intensity of the light reflected by the sensors 210, 220. A difference between the first value and the second value of the optical characteristic is configured to decrease a difference between the intensity of the first optical output signal of the first FBG sensor 210 and the intensity of the second optical output signal of the second FBG sensor 220.

One potential source of spectral non-uniformity in input light to the multiple FBG sensors 210-260 arises from a spectrally non-uniform intensity output of an input light source 290 as previously discussed in connection with FIG. 1. Another potential source of non-uniformity in input light to the multiple FBG sensors 210-260 arises from scattering losses in the optical fiber 275. For example, a first FBG sensor 210 located closer to the light source 290 may receive higher intensity input light and a second FBG sensor 220 located farther from the light source 290 may receive a relatively lower intensity input light due to scattering losses the occur as the input light travels along the optical fiber 275. In these situations, the difference between the first and second values of the optical characteristic may be based on the distance between the sensors.

Figure 2B:
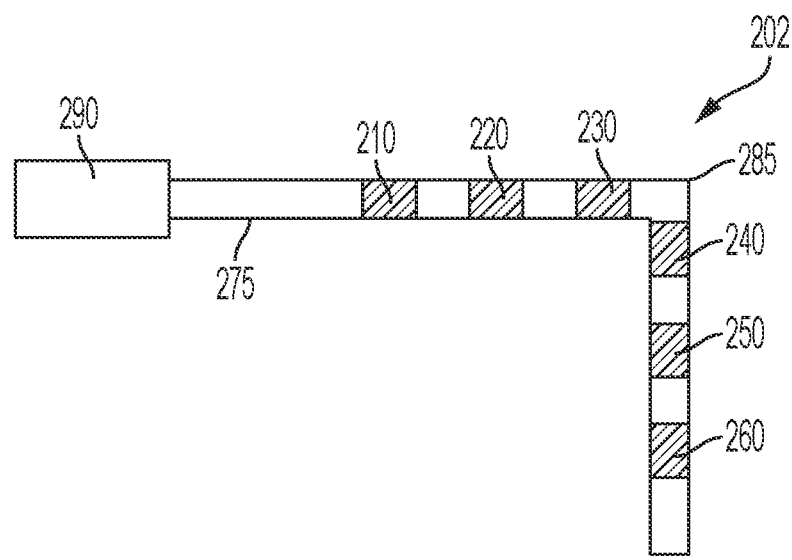
FIG. 2B shows a sensing system comprising an optical fiber and a compensated array of FBG sensors inscribed along optical fiber that has one or more bends in accordance with some embodiments.

In some configurations of a sensing system 202, as depicted in FIG. 2B, the optical fiber 275 may be arranged to include one or more bends 285 in the optical fiber 275. The bends 285 increase scattering losses and may cause FBG sensors 210-230 positioned between the light source 290 and the bend 285 and receive higher intensity input light a relative to the lower intensity input light received by FBG sensors 240-260 located after the bend 285.

To compensate for variations in the input light, e.g., due to distance between the sensors, scattering losses, bends in the optical fiber, spectral non-uniformity of the input light source, and/or other variation sources, at least one of the FBG sensors 210 disposed along an optical fiber 275 may have values of one or more optical characteristics that are different from the values of the one or more optical characteristics of at least one other FBG sensor 220. The differences in the values of the one or more optical characteristics of the first and second FBG sensors 210, 220 are configured to decrease a difference between the first optical output signal of the first FBG sensor 210 and the second optical output signal of the second FBG sensor 220. For example, in some embodiments, a compensated FBG sensor array may cause the intensity of the first and second optical output signals to be substantially equalized, or to be within 10% of each other, or to be within 20% of each other. For example, the difference between the intensity of the first and second optical signals may be reduced by 5%, 25%, or even 50% when compared to a system in which the values of the one or more optical characteristics of the first sensor in the first wavelength band is substantially equal to the values of the optical characteristics of the second sensor in the second wavelength band.

Figure 3:
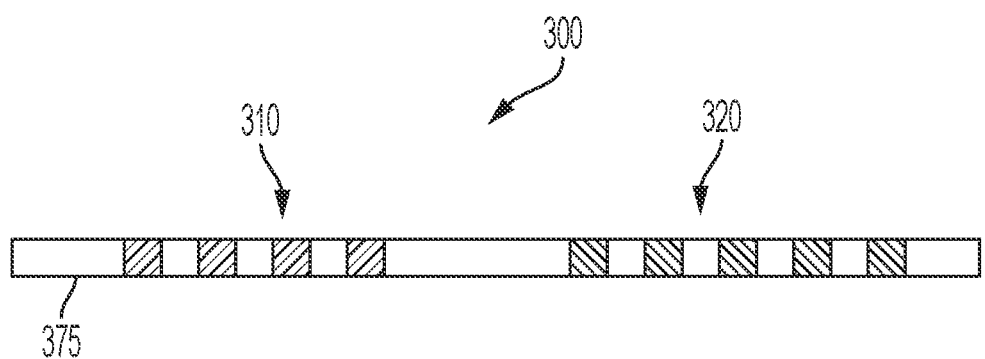
FIG. 3 illustrates a system comprising an optical fiber having a compensated sensor array comprising first and second FBG sensors having different reflectivities due to refractive index modulation inscribed thereon in accordance with some embodiments.

In some embodiments the compensating optical characteristic having different values for the first and second FBG sensors is reflectivity. FIG. 3 illustrates a system 300 comprising an optical fiber 375 having a compensated sensor array comprising first and second FBG sensors 310, 320 having different reflectivities inscribed thereon in accordance with some embodiments. Note that while the sensing system 300 of FIG. 3 depicts two FBG sensors 310, 320, it will be appreciated that more FBG sensors may be disposed on the optical fiber 375. The first FBG sensor 310 reflects a first wavelength band and the second FBG sensor 320 reflects a second wavelength band different from the first wavelength band. The first sensor 310 may receive a relatively lower intensity input light at the first wavelength band and has a relatively higher reflectivity at the first wavelength band. The second sensor 320 may receive a relatively higher intensity input light at the second wavelength band and has a relatively lower reflectivity at the second wavelength band. In this configuration, the difference in the reflectivities of the first and second FBG sensors 310, 320 at their respective wavelength bands decreases the difference between the intensity of the first optical output signal of the first FBG sensor 310 and the intensity of the second optical output signal of the second FBG sensor 320.

An FBG sensor may be configured as a portion of an optical fiber that reflects a wavelength band near a Bragg wavelength associated with the FBG sensor as output light and transmits other wavelengths. An FBG sensor can be formed by creating a periodic variation in the refractive index along a length of the optical fiber core. The reflected wavelength, $\lambda_B$, called the Bragg wavelength is equal to $$\lambda_B = 2\eta_{eff}\Lambda$$

where $\eta_{eff}$ is the effective refractive index of the sensor, and $\Lambda$ is the period of the sensor.

Figure 4:
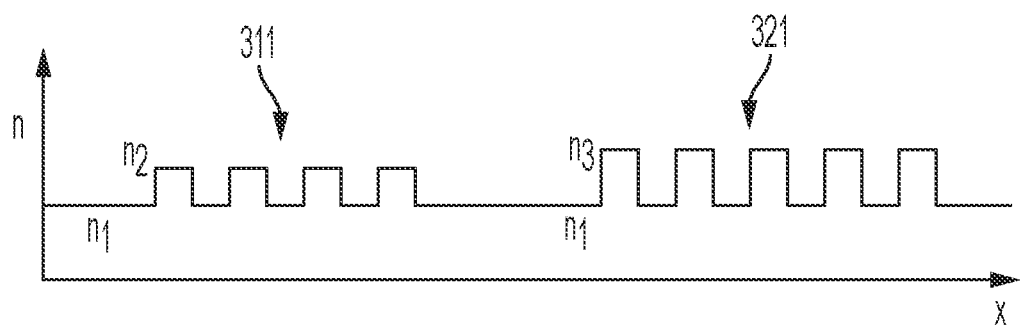
FIG. 4 is a graph illustrating the refractive index modulation of the first and second FBG sensors of FIG. 3.

The reflectivity of an FBG sensor depends on one or both of the length of the sensor (number of periods) and the strength of the refractive index modulation of the FBG sensor. FIG. 4 is a graph illustrating the refractive index modulation of the first and second FBG sensors 310, 320. The refractive index modulation is the difference between the two refractive index values of the modulation. The refractive index modulation 411 of the first sensor 310, $n_2$-$n_1$, produces a first reflectivity value at the first wavelength band of the first FBG sensor 310. The refractive index modulation 421, $n_3$-$n_1$ of the second sensor 320 produces a second reflectivity value at the second wavelength band of the second FBG sensor 320. For example, the difference between the reflectivities of the first and second sensors 310, 320 may be between 5% and 95% for example.

Figure 5:
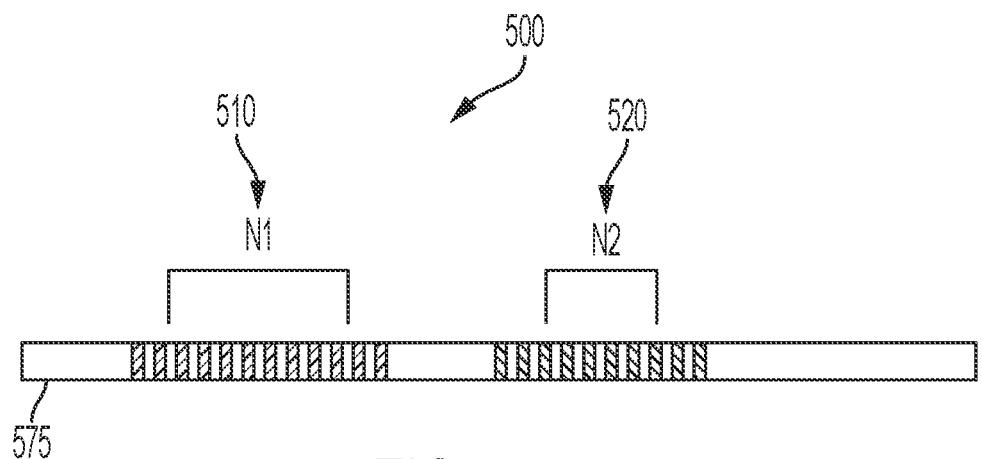
FIG. 5 depicts a sensor system comprising an optical fiber having a compensated sensor array comprising a first FBG sensor and a second FBG sensor inscribed thereon, the first and second sensors having different reflectivities due to different sensor lengths in accordance with some embodiments.

In some embodiments, the reflectivity of an FBG sensor can be dependent on the length of the FBG sensor which is a function of the number of periods of refractive index modulation of the FBG sensor. FIG. 5 depicts a sensor system comprising an optical fiber 575 having a compensated sensor array comprising a first FBG sensor 510 and a second FBG sensor 520 inscribed thereon, the first and second sensor 510, 520 having different reflectivities due to sensor length. The length of each of the sensors 510, 520 can range from about 0.5 µm to about 10 mm, for example. The first FBG sensor 510 has a relatively smaller number of periods of refractive index modulation, $N_1$, and a correspondingly lower reflectivity in the wavelength band of the first sensor 510. Compared to the first FBG sensor 510, the second FBG sensor 520 has a relatively larger number of periods of refractive index modulation, $N_2$, and a correspondingly higher reflectivity in the wavelength band of the second sensor 520. For example, the first FBG sensor 510 may have a period $\Lambda_1$ and a number of periods $N_1$ for a total length $N_1\Lambda_1$. The second FBG sensor 520 may have a period $\Lambda_2$ and a number of periods $N_2$ for a total length $N_2\Lambda_2$ where N1<N2 and/or $N_1\Lambda_1$<$N_2\Lambda_2$.

Figure 6:
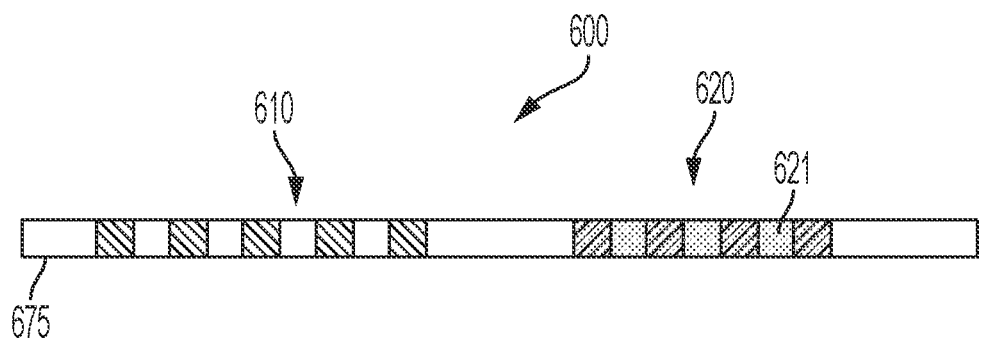
FIG. 6 illustrates a system comprising an optical fiber having a compensated array of first and second FBG sensors inscribed thereon, the each sensor differing in the amount of attenuation at the central wavelength or wavelength band of the sensor in accordance with some embodiments.

In some embodiments the compensating optical characteristic having different values for the first and second FBG sensors is optical attenuation. FIG. 6 illustrates a system 600 comprising an optical fiber 675 having a compensated sensor array comprising first and second FBG sensors 610, 620 inscribed thereon. Note that while the sensing system 600 of FIG. 6 depicts two FBG sensors 610, 620, it will be appreciated that more FBG sensors may be disposed on the optical fiber 675. The first FBG sensor 610 operates at a first wavelength band and the second FBG sensor 620 operates at a second wavelength band different from the first wavelength band. The first sensor 610 may receive a relatively lower intensity input light at the first wavelength band and has a lower optical attenuation at the first wavelength band. The second sensor 620 may receive a relatively higher intensity input light at the second wavelength band and may have a relatively higher attenuation at the second wavelength band compared to the first FBG sensor 610. In this configuration, the difference in attenuation values of the first and second FBG sensors 610, 620 at their respective wavelength bands decreases the difference between the intensity of the first optical output signal of the first FBG sensor 610 and the intensity of the second optical output signal of the second FBG sensor 620.

Attenuation of the light may be the result many processes, such as, scattering, reflection, deflection, absorption, and/or diffraction, for example. Materials can be selected with low attenuation in mind, such as those used over long distances, and/or with high attenuation, such as those in fiber optic attenuators, which absorb light. Discontinuities in the optical path can also introduce scattering, which can attenuate light. Discontinuities can be introduced by way of doping a material, imperfections in the waveguide structure, and/or material transitions (fiber optic connectors), for example.

According to various embodiments described herein, there are multiple examples of input light attenuation. The attenuation loss may be inherent to the fiber cable material. On shorter distances, this loss may be negligible, however, when traversing hundreds or thousands of kilometers, this becomes noticeable due to scattering and/or absorption, for example. The attenuation loss may be inherent to a maximum fiber cable bend radius. For example, sharp bends in a fiber cable allow light to scatter out of the waveguide. In some cases, the attenuation loss may be due to discontinuities in the light path. For example, fiber optic connectors fiber optic connectors (i.e., LC/APC, FC/APC, etc.) introduce loss into a system due to imperfect coupling of light between two connecting waveguides. According to various embodiments loss may be due to optical splitters. Fiber optic splitters are used to split input light into multiple output waveguides, which may cause the output light to have a lower signal that the input light. In come embodiments, loss may be due to optical attenuators. Fiber optic attenuators may be used to intentionally attenuate the strength of light in the waveguide. This component is often used to absorb light, thereby reducing the power of light transmitted. This is particularly useful when a readout sensor is in saturation, for example.

Figure 7A:
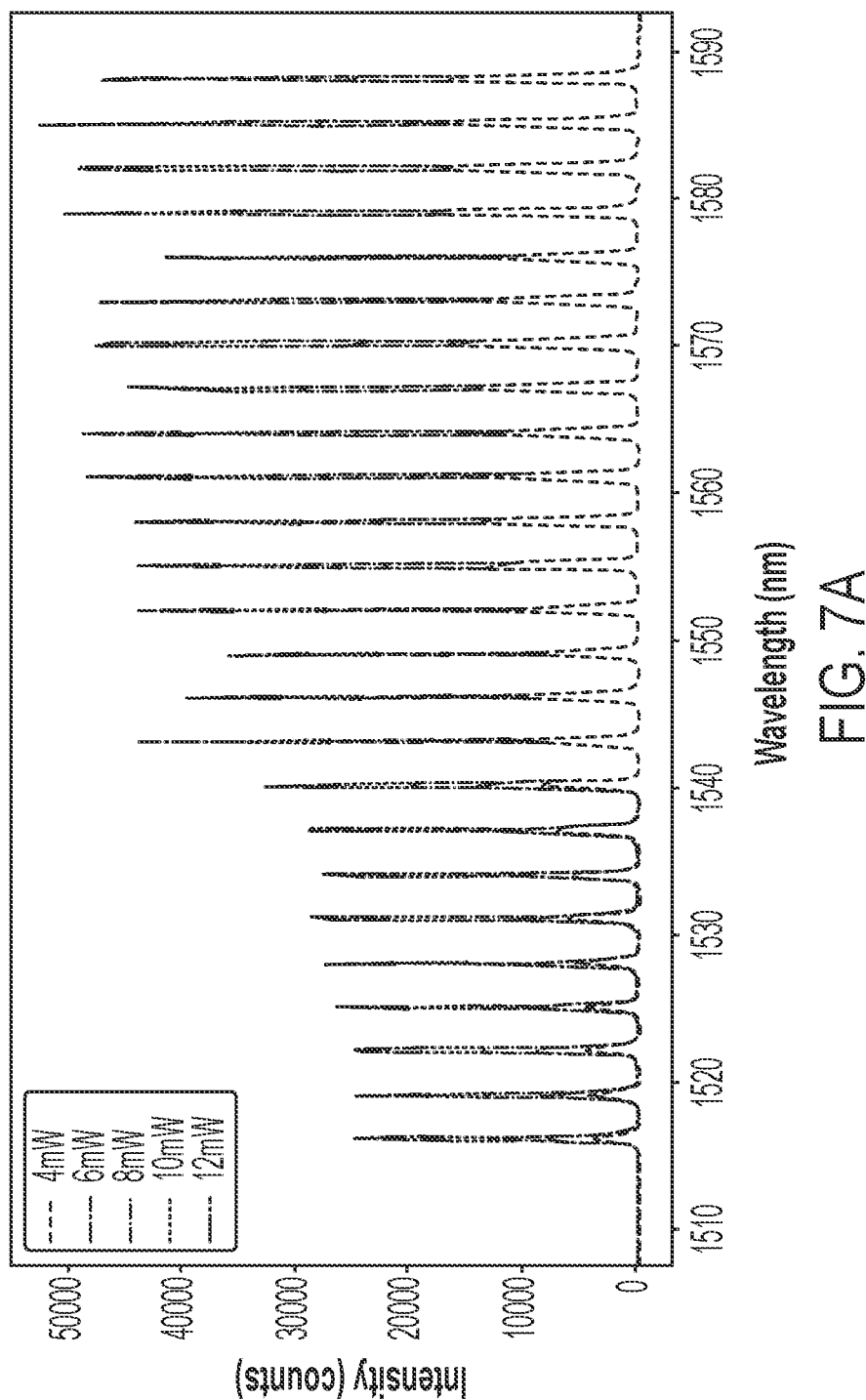
FIGS. 7A and 7B provide a comparison graphs indicating reflected light from multiple sensors in a system comprising an uncompensated sensor array (FIG. 7A) and reflected light from multiple sensors in a system comprising a compensated sensor array system (FIG. 7B) in which the sensors have different reflectivities compensating for the spectral non-uniformity of the light source in accordance with some embodiments.
Figure 7B:
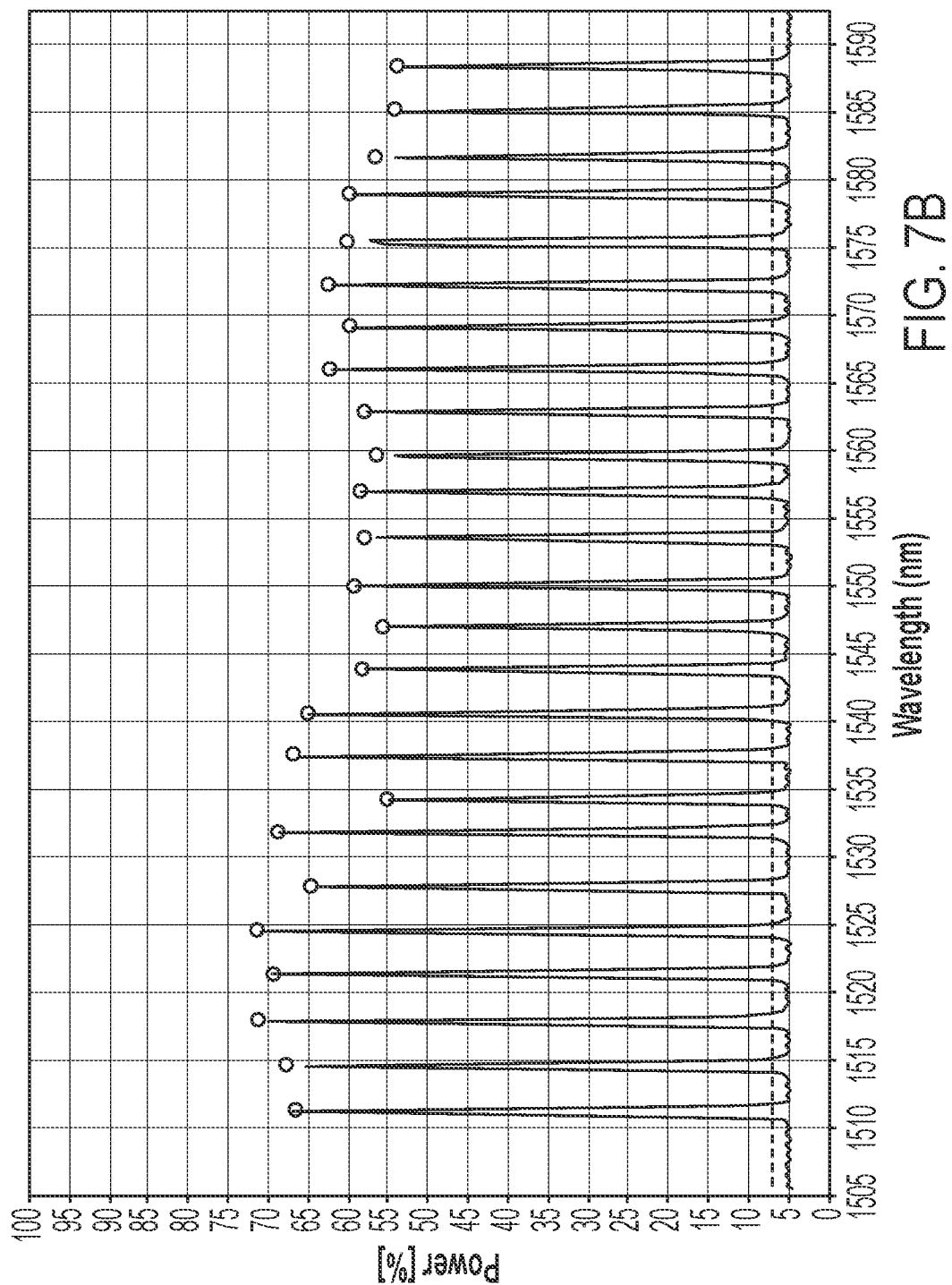

The approaches discussed above provide for systems having compensated sensor arrays in which the sensor output signals are compensated for differences in input light intensity. These systems decrease the difference in the intensity of the reflected light from the FBG sensors. FIGS. 7A and 7B are graphs that compare reflected output signals from multiple sensors in an uncompensated system to reflected output signals from multiple sensors in a compensated array. In FIG. 7A, the sensors in the uncompensated array are not compensated for differences in the intensity of the input light. In FIG. 7B each sensor in the compensated array has a reflectivity that compensates for differences in the intensity of the input light due to spectral non-uniformity of the light source. It will be appreciated from FIGS. 7A and 7B that the difference in intensities of the light reflected from the sensors in the compensated array (FIG. 7B) is decreased when compared to the difference in intensities of the light reflected from the sensors in the uncompensated array (FIG. 7A).

Figure 8:
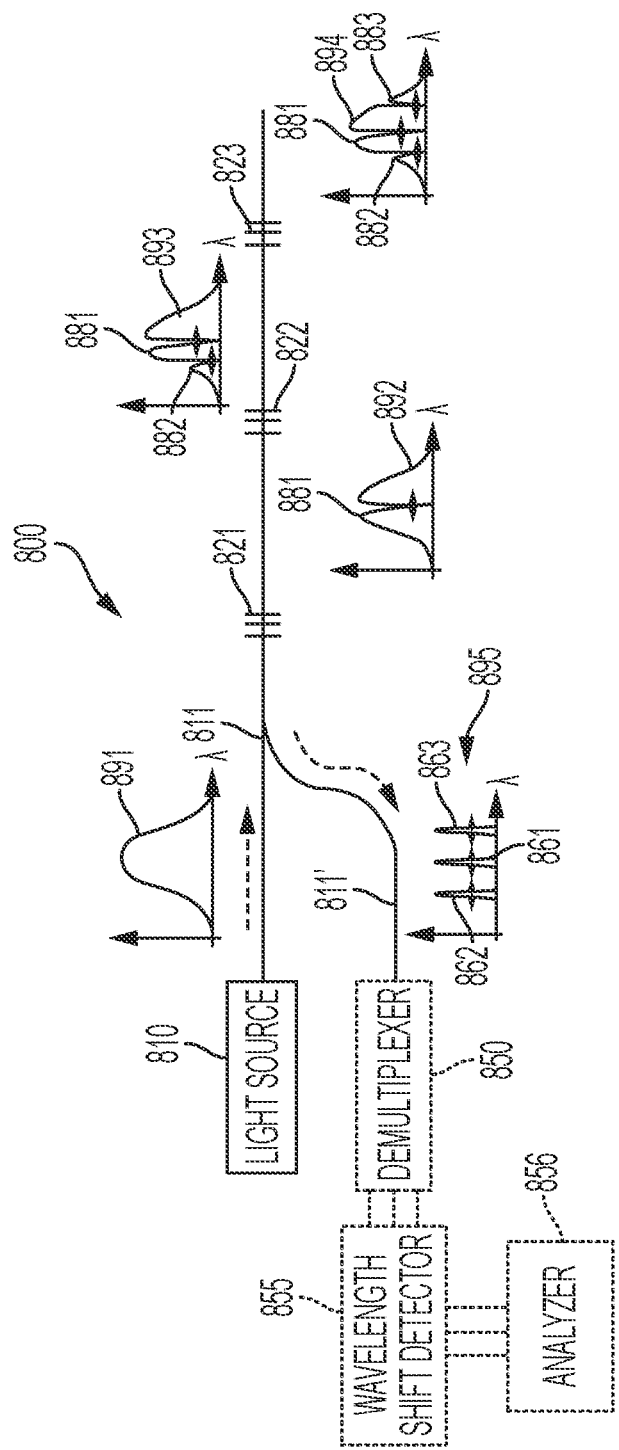
FIG. 8 shows a wavelength multiplexed sensor system comprising a compensated array comprising multiple FBG sensors disposed on a single optical fiber in accordance with some embodiments.

As previously discussed and now shown in FIG. 8, a wavelength multiplexed system 800 can use a compensated sensor array comprising multiple FBG sensors 821, 822, 823 disposed on a single optical fiber 811. The sensors 821-823 may be arranged to sense parameters including one or more of temperature, strain, and/or vibration, for example. As indicated in FIG. 8, input light is provided by the light source 810, which may comprise or be a light emitting diode (LED) or superluminescent laser diode (SLD), for example. The spectral characteristic (intensity vs. wavelength) of broadband light is shown by inset graph 891. The intensity is highest near the middle of the spectrum and falls off at the spectrum edges. The sensors 821, 822, 823 include compensation, e.g., one or more of different reflectivities and different attenuations, that decreases the difference in the intensity of the output signal light reflected by the sensors to compensate for the input light that is non-uniform in intensity, e.g., due to spectral non-uniformity of the light source and/or scattering losses in the optical fiber. The input light is transmitted via the optical fiber (FO) cable 811 to the first FBG sensor 821. The first FBG sensor 821 reflects a portion of the light in a first wavelength band having a central wavelength, λ1. Light having wavelengths other than within the first wavelength band is transmitted through the first FBG sensor 821 to the second FBG sensor 822. The spectral characteristic of the light transmitted to the second FBG sensor 822 is shown in inset graph 892 and exhibits a notch 881 at the first wavelength band centered at λ1 indicating that light in this wavelength band is reflected by the first sensor 821.

The second FBG sensor 822 reflects a portion of the light in a second wavelength band having a central wavelength, λ2. Light that is not reflected by the second FBG sensor 822 is transmitted through the second FBG sensor 822 to the third FBG sensor 823. The spectral characteristic of the light transmitted to the third FBG sensor 823 is shown in inset graph 893 and includes notches 881, 882 centered at λ1 and λ2.

The third FBG sensor 823 reflects a portion of the light in a third wavelength band having a central or peak wavelength, λ3. Light that is not reflected by the third FBG sensor 823 is transmitted through the third FBG sensor 823. The spectral characteristic of the light transmitted through the third FBG sensor 823 is shown in inset graph 894 and includes notches 881, 882, 883 centered at λ1, λ2, and λ3.

Light in wavelength bands 861, 862, 863, having central wavelengths λ1, λ2 and λ3 (illustrated in inset graph 895) is reflected by the first, second, or third FBG sensors 821, 822, 823, respectively, along the FO cables 811 and 811' to an the optical wavelength demultiplexer 850. Compensating input characteristics of sensors 821, 822, 823 cause the difference in the intensity peaks of the light 861, 862, 863 to be reduced when compared to the intensity peaks from an uncompensated sensor array.

From the wavelength demultiplexer 850, the sensor light 861, 862, 863 may be routed to a wavelength shift detector 855 that generates an electrical signal responsive to shifts in the central wavelengths λ1, λ2 and λ3 and/or wavelength bands of the sensor light. The wavelength shift detector 855 receives reflected light from each of the sensors and generates corresponding electrical signals in response to the shifts in the central wavelengths λ1, λ2 and λ3 or wavelength bands of the light reflected by the sensors 821-823. The analyzer 856 may compare the shifts to a characteristic base wavelength (a known wavelength) to determine whether changes in the values of the parameters sensed by the sensors 821-823 have occurred. The analyzer 856 may determine that the values of one or more of the sensed parameters have changed based on the wavelength shift analysis and may calculate a relative or absolute measurement of the change.

In some cases, instead of emitting broadband light, the light source may scan through a wavelength range, emitting light in narrow wavelength bands to which the various sensors disposed on the FO cable are sensitive. The reflected light is sensed during a number of sensing periods that are timed relative to the emission of the narrowband light. For example, consider the scenario where sensors 1, 2, and 3 are disposed on a FO cable. Sensor 1 is sensitive to a wavelength band (WB1), sensor 2 is sensitive to wavelength band WB2, and sensor 3 is sensitive to WB3. The light source may be controlled to emit light having WB1 during time period 1 and sense reflected light during time period 1a that overlaps time period 1. Following time period 1a, the light source may emit light having WB2 during time period 2 and sense reflected light during time period 2a that overlaps time period 2. Following time period 2a, the light source may emit light having WB3 during time period 3 and sense reflected light during time period 3a that overlaps time period 3. Using this version of time domain multiplexing, each of the sensors may be interrogated during discrete time periods. When the intensity of the narrowband light sources varies, a compensated sensor array as discussed herein may be useful to compensate for the intensity variation of the sources.

The FO cable may comprise a single mode (SM) FO cable (as depicted in FIG. 8) or may comprise a multi-mode (MM) FO cable. While single mode fiber optic cables offer signals that are easier to interpret, to achieve broader applicability and lower costs of fabrication, multi-mode fibers may be used. MM fibers may be made of plastic rather than silica, which is typically used for SM fibers. Plastic fibers may have smaller turn radii when compared with the turn radii of silica fibers. This can offer the possibility of curved or flexible configurations, for example. Furthermore, MM fibers can work with less expensive light sources (e.g., LEDs) as opposed to SM fibers that may need more precise alignment with superluminescent diodes (SLDs). Therefore, sensing systems based on optical sensors in MM fibers may yield lower cost systems.

Figure 9:
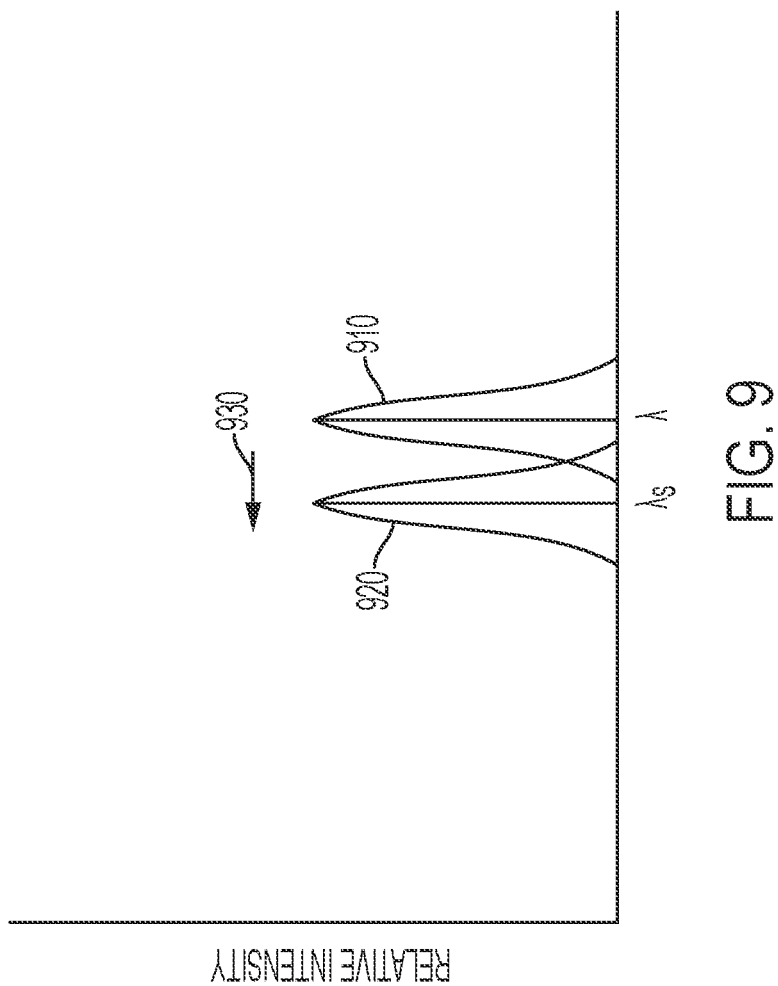
FIG. 9 is an idealized representation of light reflected from a FBG sensor deployed on a single mode optical fiber cable.

FIG. 9 is an idealized representation of light reflected from a FBG sensor deployed on a SM FO cable. In the characteristic base or known state, the FBG sensor reflects light in a relatively narrow wavelength band 910 having a central (or centroid) wavelength, λ. After the FBG sensor experiences a change in the sensed condition, e.g., a change in temperature, strain, chemical environment, the light reflected by the sensor shifts to a different wavelength band 920 having central (or centroid) wavelength λs. Wavelength band 920 is similar in width, amplitude and other morphological characteristics when compared to wavelength band 910, but the wavelength, λs, of wavelength band 920 is shifted 930 from the wavelength, λ, of wavelength band 910 by an amount that is related to the change in the sensed condition.

Figure 10A:
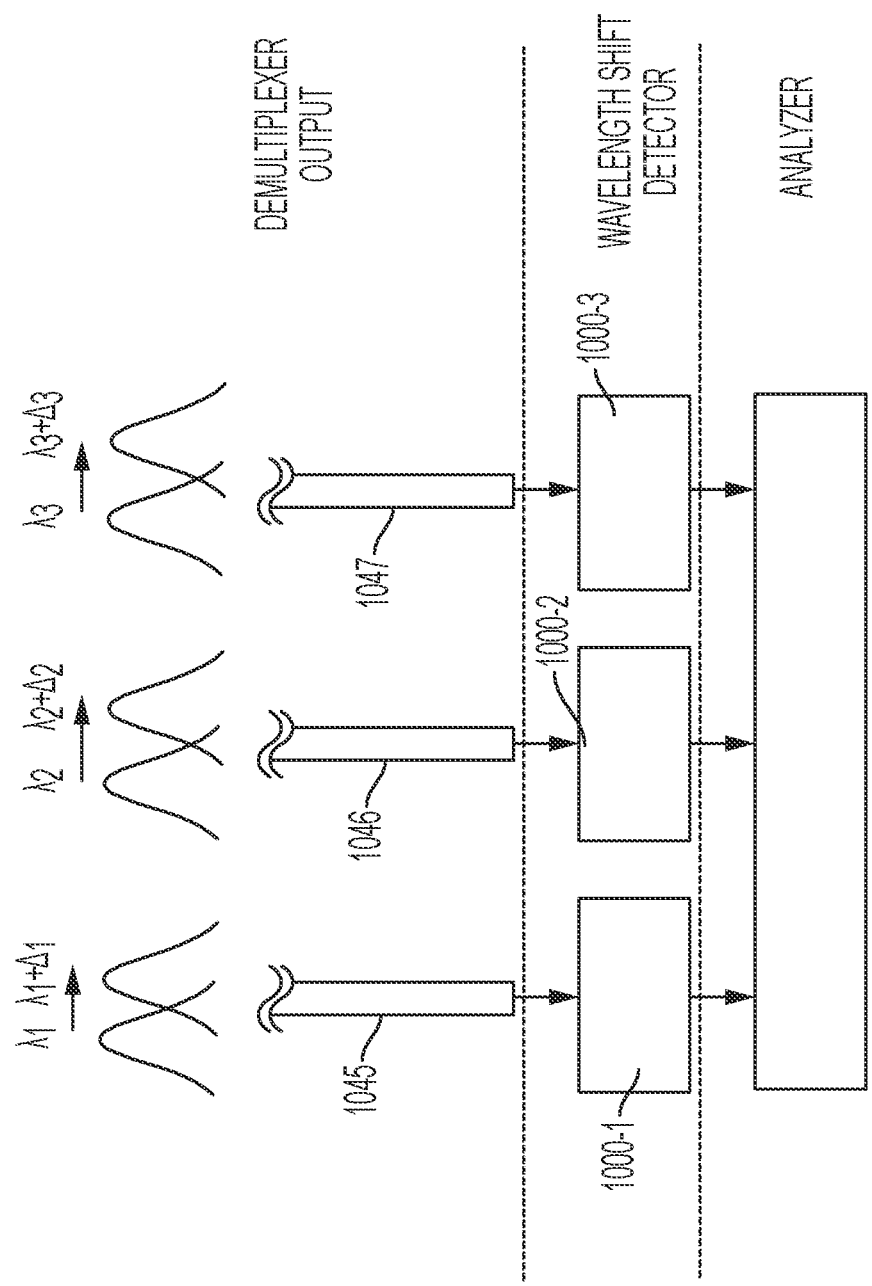
FIG. 10A is a block diagram illustrating portions of a demultiplexer output, wavelength shift detector, and analyzer in accordance with some embodiments.

FIG. 10A is a block diagram illustrating portions of a demultiplexer output, wavelength shift detector, and analyzer that can be used in the system 800 of FIG. 8. The demultiplexer output includes three optical fibers 1045, 1046, 1047 carrying the demultiplexed reflected light from sensors 821, 822, 823, respectively. In a compensated system, the intensity of the light carried by each of the sensors is more uniform when compared to a substantially similar system that does not include compensation for the input light. As the values of the sensed parameters change, the central or centroid wavelength of light reflected by the first sensor 821 may shift from $\lambda_1$ to of $\lambda_1+\Delta_1$; the central or centroid wavelength of light reflected by the second sensor 822 may shift from $\lambda_2$ to $\lambda_2+\Delta_2$; and the central or centroid wavelength of light reflected by the third sensor 823 may shift from $\lambda_3$ to $\lambda_3+\Delta_3$. A wavelength shift detector comprising element 1000-1, 1000-2, 1000-3 respectively receives the demultiplexed reflected light from its corresponding waveguide 1045, 1046, 1047 and generates an electrical signal responsive to the shift in the central wavelength or wavelength band of the reflected light. The analyzer may compare each electrical signal from the wavelength shift detector elements 1000-1, 1000-2, 1000-3 that indicate the shift to a known baseline or to a previous value to determine if a change in the value of the parameter sensed by the sensor has occurred.

Figure 10B:
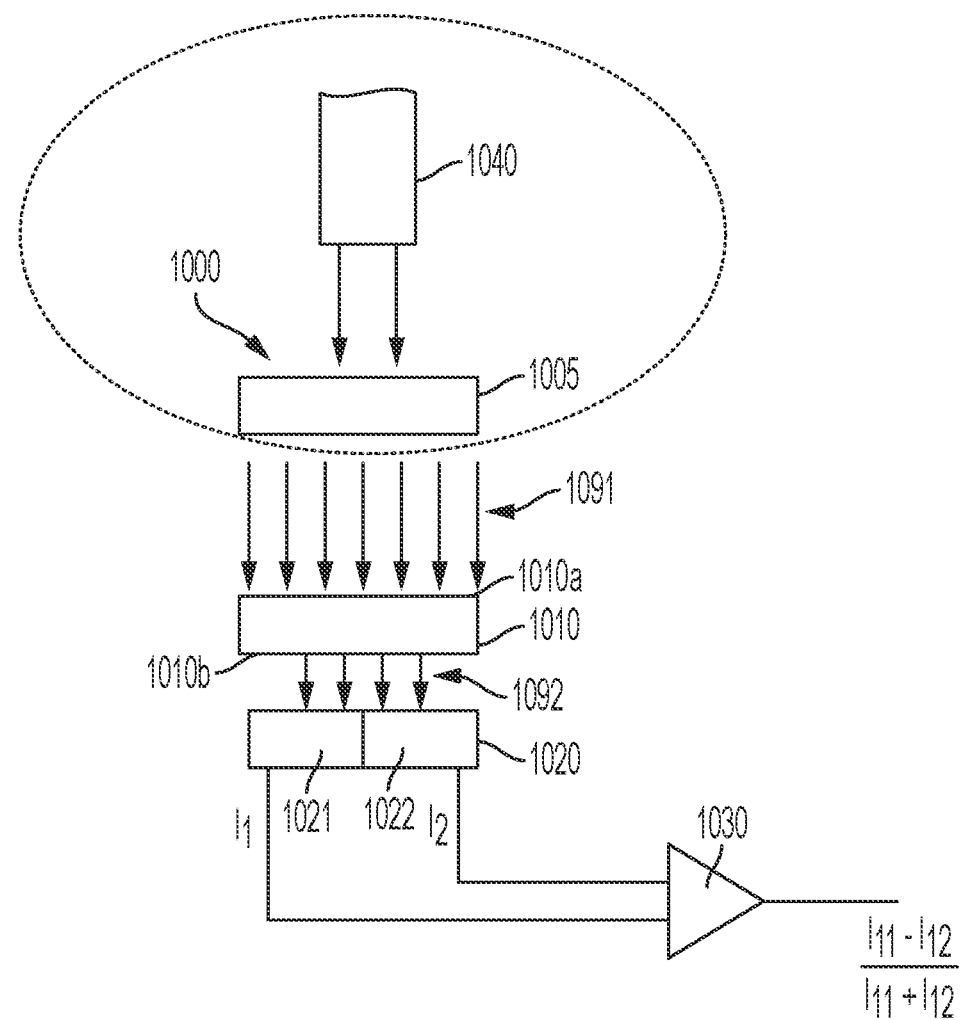
FIG. 10B illustrates in more detail a wavelength shift detector according to some embodiments.

FIG. 10B illustrates in more detail a wavelength shift detector 1000 according to some embodiments. Optionally the wavelength shift detector 1000 includes a spreading component 1005 configured to collimate and/or spread the light from an output waveguide 1040 of the demultiplexer across the input surface of a linearly variable transmission structure (LVTS) 1010 or other spatially dispersive optical element. In arrangements where sufficient spreading of the light occurs from the output waveguide 1040 the spreading component 1005 may not be used. The LVTS 1010 comprises a dispersive element, such as a prism or a linear variable filter. The LVTS 1010 receives light 1091 at its input surface 1010a from the waveguide 1040 and (optionally) the spreading component 1005 and transmits light from its output surface 1010b to photodetector pairs 1020. At the output surface 1010b of the LVTS 1010, the wavelength of the light varies with distance along the output surface 1010b.

A photodetector pair 1020 is positioned relative to the LVTS 1010 so that light 1092 transmitted through the LVTS 1010 falls on the photodetector pair 1020. For example, light 1092 having wavelength λ1 may fall predominantly on photodetector 1021 and light 1092 having wavelength λ1+Δ1 may fall predominantly on photodetector 1022. The photodetector 1021 generates signal $I_1$ in response to light falling on its light sensitive surface and photodetector 1022 generates signal $I_2$ in response to light falling on its light sensitive surface. The signals $I_1$, $I_2$ include information about the sensed parameter such that a change in the ratio of $I_1$ and $I_2$ indicates a change in the sensed parameter. An electrical signal responsive to the change can be calculated using the equation $$I_1 = \frac{I_{11} - I_{12}}{I_{11} + I_{12}}.$$

shown in FIG. 10A may be configured to detect changes in I which indicate changes in the value of the parameter sensed by the sensor.

In some embodiments, a system includes first and second electrical signals corresponding to first and second sensors. The first electrical signal is responsive to shifts of the parameter sensed by the first sensor and the second electrical signal is responsive to shifts of the parameter sensed by the second sensor. The compensation of the first and second sensors to the input light reduces the difference between intensity of the first optical output signal of the first sensor and the intensity of the second optical output signal of the second sensor. Reducing the difference between intensities of the first and second output signals correspondingly reduces the difference between the amplitude of the first electrical signal and the amplitude of the second electrical signal.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A sensor system comprising:
   an optical fiber; and
   a set of wavelength shift sensors inscribed on the optical fiber, the set comprising:
   at least one first wavelength shift sensor configured to reflect a first wavelength band of input light as a first optical output signal, the first wavelength shift sensor having a first value of an optical characteristic that modifies intensity of the first wavelength band of input light; and
   at least one second wavelength shift sensor configured to reflect a second wavelength band of input light as a second optical output signal, the second wavelength shift sensor having a second value of the optical characteristic that modifies intensity of the second wavelength band of input light, wherein the second value is different from the first value.

2. The sensor system of claim 1, wherein a difference between the first value and the second value is configured to decrease a difference between the intensity of the first optical output signal and the intensity of the second optical output signal.

3. The sensor system of claim 1, wherein a difference between the first value and the second value is configured to decrease a difference in at least one of a first signal to noise ratio (SNR) of the first optical output signal and a second SNR of the second optical output signal.

4. The sensor system of claim 1, wherein a difference between the first and second values is configured such that the intensities of the first and second optical output signals are substantially equal.

5. The sensor system of claim 1, wherein the optical characteristic comprises reflectivity and a difference between the first and second values of reflectivity is a function of a difference between a first amplitude of refractive index modulation of the first wavelength shift sensor and a second amplitude of refractive index modulation of the second wavelength shift sensor.

6. The sensor system of claim 1, wherein the optical characteristic comprises reflectivity and a difference between the first and second values of reflectivity is a function of a difference between a first number of periods of a Bragg wavelength of the first wavelength shift sensor inscribed on the optical fiber and a second number of periods of a Bragg wavelength of the second wavelength shift sensor inscribed on the optical fiber.

7. The sensor system of claim 1, wherein the optical characteristic comprises attenuation of input light.

8. The sensor system of claim 1, wherein:
   the first wavelength shift sensor is disposed at a first location on the optical fiber;
   the second wavelength shift sensor is disposed at a second location on the optical fiber; and
   the difference between the first and second values is based on a distance between the first location and the second location.

9. The sensor system of claim 1, wherein:
   the optical fiber is configured such that optical scattering losses occur along the optical fiber; and
   a difference between the first value and the second value is based on the scattering losses.

10. The sensor system of claim 9, wherein at least some of the scattering losses are due to bends in the optical fiber.

11. The sensor system of claim 1, further comprising a wavelength shift detector optically coupled to the optical fiber and configured to:
   receive the first and second optical output signals from the first and second wavelength shift sensors;
   detect a wavelength shift in the first wavelength band and a wavelength shift in the second wavelength band; and generate a first electrical signal responsive to the wavelength shift in the first wavelength band and a second electrical signal responsive to the wavelength shift in the second wavelength band, wherein a difference in amplitude of the first and second electrical signals is responsive to a difference between the intensity of the first optical output signal the intensity of the second optical output signal.

12. The sensor system of claim 1, wherein the wavelength shift sensors comprise one or more of fiber Bragg grating (FBG) sensors and Fabry-Perot sensors.

13. A method of making a sensor system comprising inscribing a set of wavelength shift sensors on an optical fiber, the set comprising:
  at least one first wavelength shift sensor configured to reflect a first wavelength band of input light as a first optical output signal, the first wavelength shift sensor having a first value of an optical characteristic that affects intensity of the first optical output signal; and
  at least one second wavelength shift sensor configured to reflect a second wavelength band of input light as a second optical output signal, the second wavelength shift sensor having a second value of an optical characteristic that affects intensity of the second optical output signal, wherein the first value is different from the second value.

14. The method of claim 13, wherein a difference between the first and second values of the optical characteristic is configured to decrease a difference between intensity of the first optical output signal and intensity of the second optical output signal.

15. The method of claim 13, wherein inscribing the set of wavelength shift sensors on the optical fiber comprises:
  inscribing the first wavelength shift sensor having a first amplitude of refractive index modulation; and
  inscribing the second wavelength shift sensor having a second amplitude of refractive index modulation, wherein a difference between the first and second values is a function of a difference between the first amplitude and the second amplitude.

16. The method of claim 15, wherein inscribing the set of wavelength shift sensors on the optical fiber comprises:
  inscribing a first number of periods of a Bragg wavelength of the first wavelength shift sensor; and
  inscribing a second number of periods of a Bragg wavelength of the second wavelength shift sensor the second wavelength shift sensor, wherein a difference between the first and second values is a function of a difference between the first number and the second number.

17. The method of claim 13, wherein the optical characteristic comprises attenuation of input light.

18. A method comprising:
generating input light for a sensor system, the sensor system comprising:
  an optical fiber; and
  a set of wavelength shift sensors inscribed on the optical fiber, the set comprising:
    at least one first wavelength shift sensor having a first value of an optical characteristic; and
    at least one second wavelength shift sensor having a second value of the optical characteristic different from the first value;
reflecting a first wavelength band of the input light as a first optical output signal, the first value of the optical characteristic affecting intensity of the first optical output signal; and
reflecting a second wavelength band of the input light as a second optical output signal, the second value of the optical characteristic affecting intensity of the second optical output signal.

19. The method of claim 18, wherein a difference between the first value and the second value is configured to decrease a difference in a signal to noise ratio (SNR) of at least one of the first optical output signal and the second optical output signal.

20. The method of claim 18, further comprising:
  detecting a shift in the first wavelength band and generating a first electrical signal responsive to the shift; and
  detecting a shift in the second wavelength band and generating a second electrical signal responsive to the shift, wherein a difference in an amplitude of the first electrical signal and an amplitude of the second electrical signal is responsive to the difference between the intensity of the first optical output signal and the intensity of the second optical output signal.

* * * * *